United States Patent [19]
Borrel et al.

[11] Patent Number: 5,448,686
[45] Date of Patent: Sep. 5, 1995

[54] MULTI-RESOLUTION GRAPHIC REPRESENTATION EMPLOYING AT LEAST ONE SIMPLIFIED MODEL FOR INTERACTIVE VISUALIZATION APPLICATIONS

[75] Inventors: Paul Borrel, Peekskill; Jaroslaw R. Rossignac, Ossining, both of N.Y.

[73] Assignee: International Business Machines Corporation, Armonk, N.Y.

[21] Appl. No.: 816,687

[22] Filed: Jan. 2, 1992

[51] Int. Cl.⁶ .................................................. G06T 5/00
[52] U.S. Cl. .................................... 395/120; 395/123; 395/128
[58] Field of Search ................................ 395/119–121, 395/123–132, 133, 135; 358/456

[56] References Cited

U.S. PATENT DOCUMENTS

| | | | |
|---|---|---|---|
| 3,816,726 | 6/1984 | Sutherland et al. | 382/41 |
| 4,152,766 | 5/1979 | Osofsky et al. | 395/143 |
| 4,291,380 | 9/1981 | Rohner | 395/128 |
| 4,729,098 | 3/1988 | Cline | 364/413.18 |
| 4,785,399 | 11/1988 | Evans et al. | 395/156 |
| 4,855,938 | 8/1989 | Gonzalez-Lopez et al. | 395/275 |
| 4,872,064 | 10/1989 | Tutt et al. | 395/133 X |
| 4,885,703 | 12/1989 | Deering | 395/122 |
| 4,930,092 | 5/1990 | Reilly | 395/123 |
| 4,931,954 | 6/1990 | Honda et al. | 395/128 |
| 4,944,034 | 7/1990 | Ohsawa | 395/119 |
| 4,994,989 | 2/1991 | Usami et al. | 395/128 X |
| 4,999,789 | 3/1991 | Fiasconaro | 395/127 |
| 5,036,316 | 7/1991 | Kemplin | 395/118 |
| 5,161,213 | 11/1992 | Knowlton | 395/128 |
| 5,255,365 | 10/1993 | Hungerbühler | 395/128 X |
| 5,267,054 | 10/1993 | Chang et al. | 358/456 |

OTHER PUBLICATIONS

"Visualization of Molecular Structures Under the Graphics API V2 Environment at IBM 6090 and RISC System/6000 Workstations" by J. Dave et al. IBM Tech. Disc. Bulletin vol. 33, No. 10A Mar. 1991.

Computer Vision Graphics and Image Processing, vol. 51, NO. 3, Sep. 1990, USA pp. 338–354 XP172437 Manohar et al.

*Primary Examiner*—Almis R. Jankus
*Attorney, Agent, or Firm*—Perman & Green

[57] ABSTRACT

A method for execution by a data processor that prepares an object for display. The method includes a step of processing a first model of the object so as to produce a simplified model thereof, the step of processing including the steps of (a) superimposing a first plurality of grid cells on the first model; for any one of the first plurality of grid cells containing more than one vertex of the first model, (b) combining the vertices into a first representative vertex; (c) generating a first simplified model that includes the first representative vertex or first representative vertices; and (d) storing the first simplified model for subsequent use. The method encompasses a number of criteria for use by the step of combining the vertices within a grid cell. These criteria include: (a) selecting a center of the grid cell as a position of the representative vertex; (b) selecting a position of a predetermined one of the vertices within the grid cell as a position of the representative vertex; (c) selecting an average position of the vertices as a position of the representative vertex; (d) selecting a position of a vertex that is nearest to the average position as a position of the representative vertex; and (e) selecting a position of a vertex that represents a locally extreme point within the grid cell as a position of the representative vertex.

28 Claims, 9 Drawing Sheets

MODEL

FIG. 3b.

SIMPLIFIED MODEL

CELL

FIG. 3c.

OCTTREE

FIG. 4a.

CENTER OF GRID

FIG. 4b.

FIRST VORTEX

FIG. 4c.

AVERAGE

FIG. 4d.

MEDIAN

FIG. 4e.

LOCALLY EXTREME POINT

FIG. 5a.
GRID RESOLUTION 1

FIG. 5b.

FIG. 6a.
GRID RESOLUTION 2

GRID RESOLUTION 4

TRIANGLE LIST
EDGE LISTS
VERTICE LIST

ORIGINAL MODEL (WITH TRIANGULATION)
GRID CELLS

FIG. 13b.

SIMPLIFIED MODEL
GRID CELLS

FIG. 14.

MULTI-RESOLUTION GRAPHIC REPRESENTATION EMPLOYING AT LEAST ONE SIMPLIFIED MODEL FOR INTERACTIVE VISUALIZATION APPLICATIONS

FIELD OF THE INVENTION

This invention relates generally to solid modelling and, in particular, to methods and apparatus for displaying an object at a plurality of levels of resolution.

BACKGROUND OF THE INVENTION

Graphic representations of large size engineering models, medical images, or computer generated scenes for multimedia applications typically contain millions of facets, that is, elements of surface tesselations. The computing power required for rendering such complex models, in realtime, is presently beyond the reach of parallel data processing architectures. However, realtime interactive manipulation of viewing conditions provide important clues for understanding an object's geometry and relative positions. In general, these visual clues cannot be obtained from sequences of static images. Furthermore, interactive viewpoint manipulation to accomplish, by example, a walkthrough through an engineering assembly model, or to visually inspect medical data, requires realtime feedback and smooth object motion.

To achieve the required performance, it is known to use an alternate representation of the model, which is less computationally expensive to display. For example, in many Computer Assisted Design (CAD) and animation systems wireframe models, or boxes placed around the objects, are used during realtime manipulation. However, these simplified graphic substitute models often produce images having thousands of displayed lines. This number of lines is difficult to interpret, especially in clustered visual environments.

It is thus one object of the invention to provide method and apparatus that employs one or more simplified object models for display to a viewer, the simplified models being stored and accessed as required.

It is another object of the invention to provide a method for simplifying a triangulated object model, the method operating on vertices of the model.

SUMMARY OF THE INVENTION

The foregoing and other problems are overcome and the objects of the invention are realized by a method, and apparatus for practicing the method, that operates by removing small details in a scene and displaying only major features during interactive manipulation. The method employs bounding boxes placed around objects to decide whether the object, or what features of the object, are to be displayed. The inventors have determined that many details in a displayed object can be eliminated, without a loss of visual information.

The method constructs a plurality of graphic models, one for each desired level of simplification. Then, as a particular object moves in the display space, the size of the object's projection on the display screen is determined and the method successively switches to graphic models of the object having different simplification factors. This results in a suppression of image detail, with a consequent improvement in realtime performance.

More specifically, there is disclosed a method for execution by a data processor that prepares an object for display. The method includes a step of processing a first model of the object so as to produce a simplified model thereof, the step of processing including the steps of (a) superimposing a first plurality of grid cells on the first model; for any one of the first plurality of grid cells containing more than one vertex of the first model, (b) combining the vertices into a first representative vertex; (c) generating a first simplified model that includes the first representative vertex or first representative vertices; and (d) storing the first simplified model for subsequent use.

The method, in one embodiment, includes a step of processing the first model to produce a second simplified model thereof by the steps of (e) superimposing a second plurality of grid cells on the first model, the second plurality of grid cells being larger than the first plurality of grid cells; (f) for any one of the second plurality of grid cells containing more than one vertex of the first model, combining the vertices into a second representative vertex; (g) generating a second simplified model that includes the second representative vertex or second representative vertices; and (h) storing the second simplified model for subsequent use.

The method, in another embodiment, includes a step of processing the first model to produce a second simplified model thereof by the steps of (e') imposing a second plurality of grid cells on the first simplified model, the second plurality of grid cells being larger than the first plurality of grid cells; (f') for any one of the second plurality of grid cells containing more than one vertex of the first simplified model, combining the vertices into a second representative vertex; (g') generating a second simplified model that includes the second representative vertex or second representative vertices; and (h') storing the second simplified model for subsequent use.

The method encompasses a number of criteria for use by the step of combining the vertices within a grid cell. These criteria include: (a) selecting a center of the grid cell as a position of the representative vertex; (b) selecting a position of a predetermined one of the vertices within the grid cell as a position of the representative vertex; (c) selecting an average position of the vertices as a position of the representative vertex; (d) selecting a position of a vertex that is nearest to the average position as a position of the representative vertex; and (e) selecting a position of a vertex that represents a locally extreme point within the grid cell as a position of the representative vertex.

The step of processing includes an initial step of triangulating the faces of the object, and the step of generating a first simplified model includes a step of detecting and eliminating degenerate and duplicate triangles that result from the execution of the step of combining.

During display of the object, the method further includes a step of selecting the first model or the simplified model for display. In one embodiment, the step of selecting a model includes a step of determining a size of a projection of a bounding box of the object onto a display screen, and the step of selecting a model selects either the first model or the simplified model as a function of at least the determined size of the projection.

In response to a required motion of the object on the display, the step of selecting a model selects the first model if the time required to display the first model is not inconsistent with providing realtime motion of the object on the display means, otherwise the step of selecting selects a simplified model, the display of which is not inconsistent with providing realtime motion.

BRIEF DESCRIPTION OF THE DRAWING

The above set forth and other features of the invention are made more apparent in the ensuing Detailed Description of the Invention when read in conjunction with the attached drawing, wherein:

FIG. 6b illustrates the simplified object Model that results from clustering vertices within the grid cells of FIG. 6a;

FIG. 7b illustrates the simplified object Model that results from clustering vertices within the grid cells of FIG. 7a;

FIG. 12a diagramatically illustrates a relationship between a vertex list, an edge list, and a triangle list;

FIG. 12b illustrates a portion of a model that corresponds to the lists of FIG. 12a;

DETAILED DESCRIPTION OF THE INVENTION

Figures 1A, 1B:
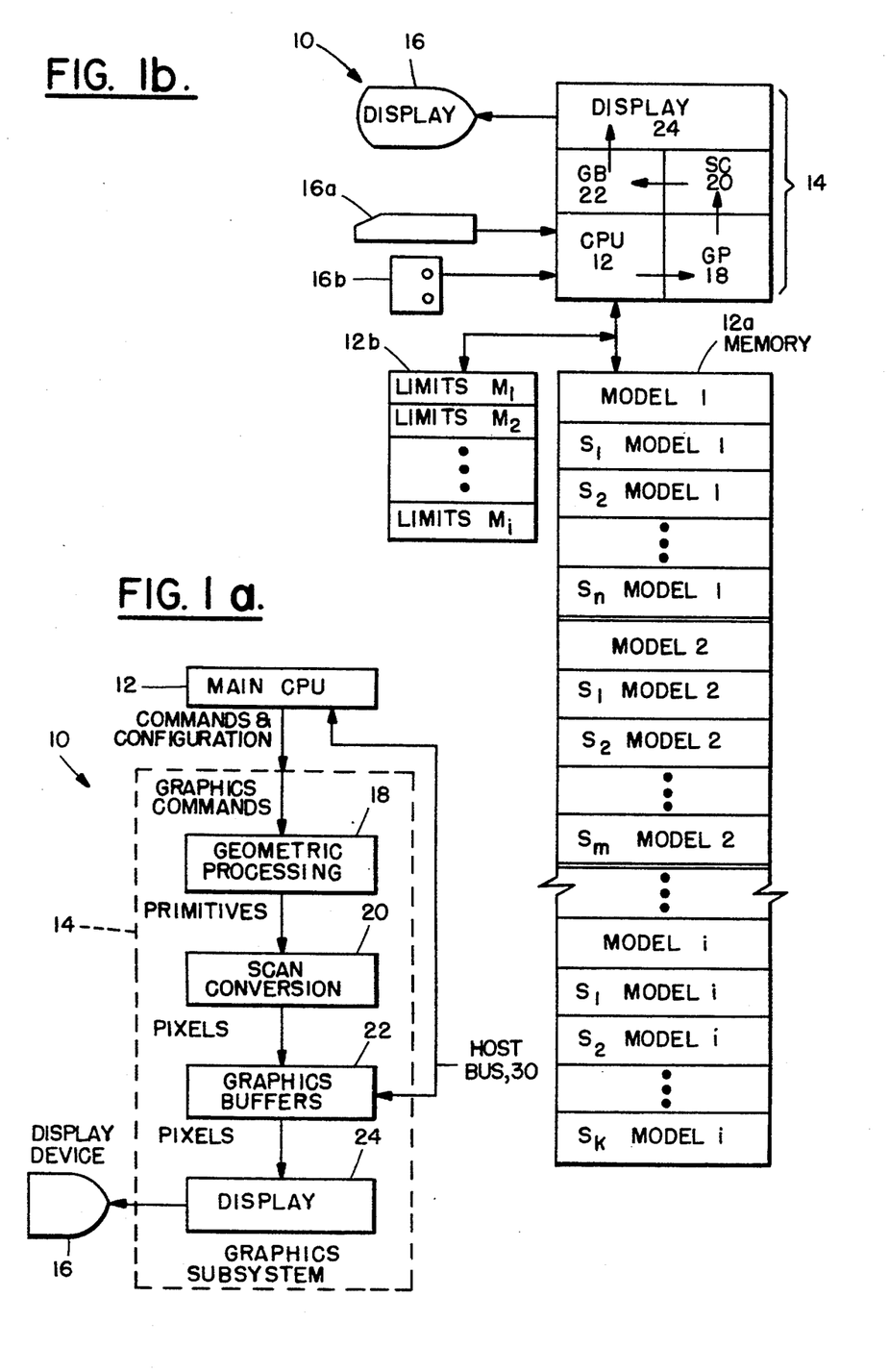
FIG. 1a is a block diagram of an exemplary raster graphics systems.
FIG. 1b is a block diagram of the raster graphic system of FIG. 1a that shows a memory for storing object models and simplified versions thereof.

An exemplary raster graphics system 10, as illustrated in FIG. 1a, includes a main (Host) processor 12 and a graphics subsystem 14. The Host processor 12 executes an application program and dispatches graphics tasks to the graphics subsystem 14.

The graphics subsystem 14 includes several components that perform operations necessary to prepare geometric entities for display on a raster display device 16. For the purposes of describing the invention, a model of the graphics subsystem 14 is employed that contains the following functional units. It should be realized that this particular model is not to be construed in a limiting sense upon the practice of the invention.

A Geometric Processing unit 18 performs geometric and perspective transformations, as well as clipping against screen (window) boundaries. The resulting graphics primitives, e.g. vertices, lines, triangles, etc., are described in screen space coordinates.

A Scan Conversion (Rasterization) unit 20 breaks down the graphics primitives into raster information, i.e. a description of display screen pixels that are covered by the graphics primitives.

A Graphics Buffer unit 22 receives, stores, and processes the pixels in accordance with the method of the invention.

A Display unit 24 receives pixels from the Graphics Buffer unit 22 and transforms these pixels into information displayed on the output device 16, typically a raster screen.

Having described an exemplary graphics processing system that is suitable for use in practicing the invention, a description is now provided of a presently preferred method of object simplification.

For the purposes of describing the invention it is assumed that objects are described as polyhedra, i.e. by their bounding polygons. Each of the polygons is represented as an ordered list of vertices. Models with curved surfaces are in general tesselated (i.e. approximated with planar polygons) for graphic purposes and thus also benefit from the simplification technique of the invention.

Preprocessing step

Figure 2:
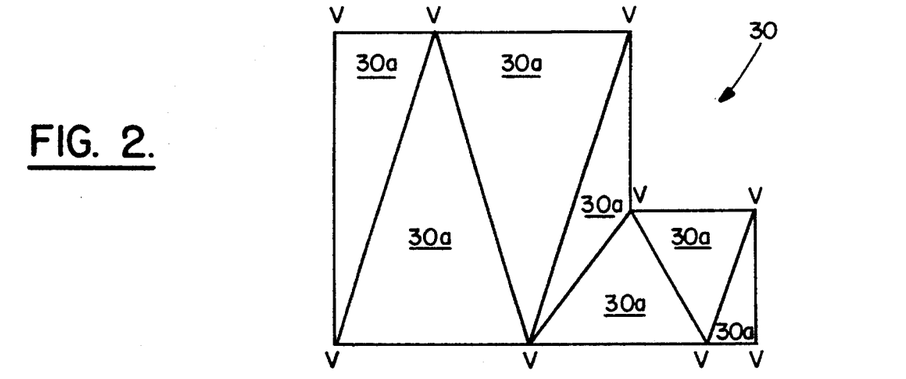
FIG. 2 shows an exemplary object that has been triangulated.

A processing step constructs one or several models (with increasing simplification factors) for each object in a scene to be visualized. A first substep of the preprocessing step is to triangulate each face of a Model 30, as illustrated in FIG. 2. Each triangle 30a has three vertices (V) associated therewith. Triangulation can be accomplished using various known algorithms and need not introduce any new vertices into the Model. As the result of the triangulation, each face of the original Model 30 is decomposed into one or more of the nonoverlapping triangular faces 30a. For lighting calculations, it is often assumed that the triangle. vertices (V) are stored in an order that corresponds to a clockwise rotation around a normal (not shown) to the face. Normals may be attached to faces or to vertices. Triangulation does not affect the normal, and does not alter the geometric object represented by the Model.

A second substep of the preprocessing step is to execute, at least once, the simplification method of the invention on the triangulated Model, thereby producing at least one simplified triangulated Model that corresponds to a simplification factor.

In general, two simplification techniques may be employed. A first technique executes each simplification operation using the original Model. A second technique executes the simplifications in order of increasing simplification factor and employs the result of the previous simplification as the starting point for a subsequent simplification.

For example, let A denote an original Model and let T denote the triangulated Model. S(T,K) is the simplified triangulated Model, obtained by simplifying T with the simplification factor K. Given a selection of three values for the simplification factor, for example K1, K2, and K3, three simplified models (T1, T2, and T3) are derived as follows:

$$T1 = S(T, K1),\ T2 = S(T, K2),\ \text{and}\ T3 = S(T, K3).$$

Alternatively, each simplification uses the Model from the previous simplification:

$T1 = S(T,K1)$, $T2 = S(T1,K2)$ and $T3 = S(T2,K3)$.

The second approach has the advantage of operating on simpler models, and thus is in general faster. Simplification factors refer to an absolute size of three-dimensional areas used for clustering.

When many simplification levels are desired, and where the simplification factors form a geometric sequence (e.g. one is the double of the previous one), a more efficient approach may be obtained by using an octtree structure (FIG. 3c) as follows. Starting from a bounding box computed around the object, for example by using minima and maxima of the coordinates of all vertices, perform a recursive subdivision and build an octtree of desired depth. Each leaf of the octtree has a pointer to one vertex. Leaves for which the maximum level is reached store a representative vertex of the cluster of vertices that fall within a cell corresponding to the leaf.

Figure 3A:
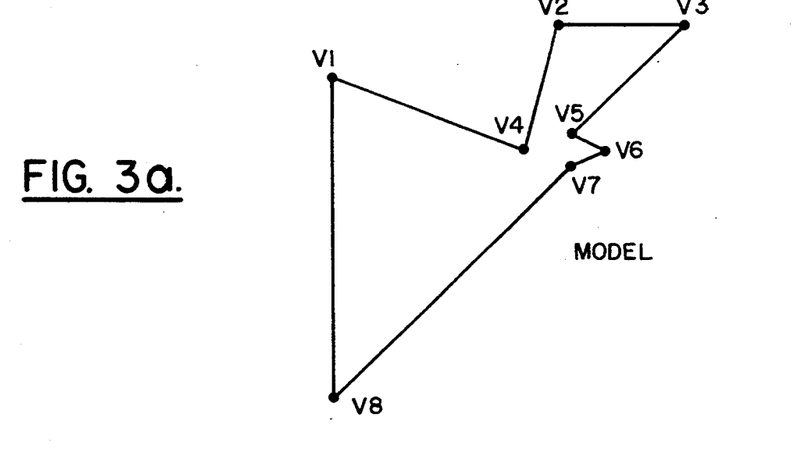
FIG. 3a illustrates a Model having vertices V1–V8.
Figure 3B:
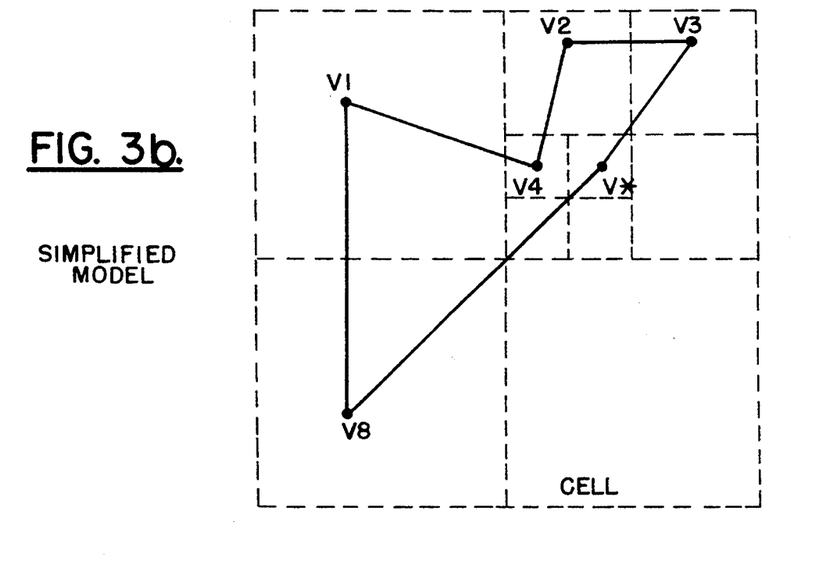
FIG. 3b shows a simplified version of the Model of FIG. 3a and a grid structure imposed thereon.
Figure 3C:
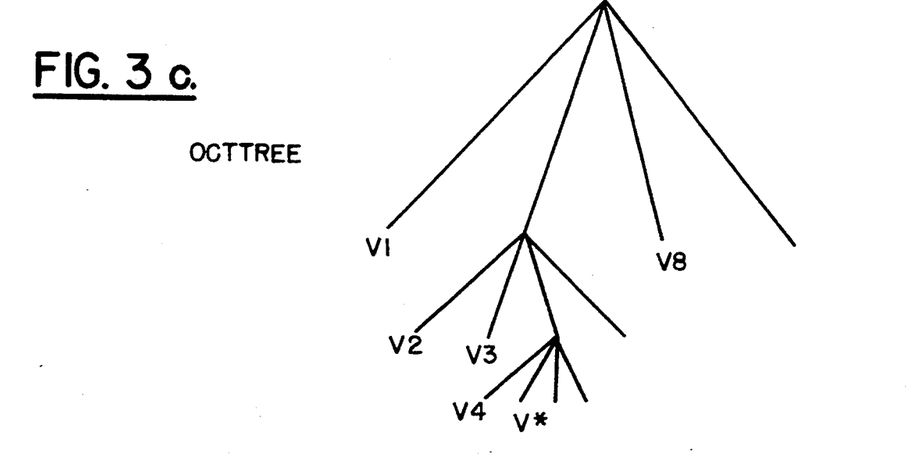
FIG. 3c is an exemplary octtree data structure for storing the vertices of the simplified Model of FIG. 3b.

FIG. 3a shows a two-dimensional object 32 and FIG. 3b shows the cells used to simplify the object 32. FIG. 3c illustrates the octtree structure representative of a cluster of simplified vertices: V5, V6, and V7. Once the octtree is constructed, it provides the vertices of the lowest simplification level. All higher simplification levels are obtained by computing representative vertices for each intermediate node of the octtree. This may be accomplished in a bottom-up traversal of the octtree. At each node, use the representative vertices of the children nodes as a cluster, and determine a single representative vertex (V*). That vertex is stored at the node of the octtree. To obtain the vertices that correspond to a particular simplification level, it is necessary only to consider vertices of octtree leaves of that level of the octtree.

Clustering

Clustering is a process by which the vertices are grouped. Grouping is preferably accomplished based on geometric proximity. A simplest grouping test is to partition a box that encloses an object into a set of disjoint three-dimensional cells, and to declare that all vertices that fall within a single cell are a cluster. Regularly spaced cells are relatively simple to implement, in that given the coordinates of a vertex, the cell to which the vertex belongs is obtained by rounding off the vertex coordinates. One suitable formula for this round-off operation is as follows: Let I,J,K represent the cell address in three dimensions. Let X0 and X1 represent the lower and higher X coordinates of the bounding box. Similar notation is used for the Y and Z coordinates. X,Y, and Z represent the vertex coordinates, K is the simplification factor, and DX, DY, DZ are the dimensions of a cell:

$I = INT((X-X0)/DX)$ with $DX = (X0-X1)/K$, where INT is an integer function that rounds off the argument.

A non-regular grid may also be used in a similar manner by transforming the vertex coordinates through a perspective transformation before applying the above formula.

The selection of the vertex representing a cluster occurs whenever there is more than one vertex in the cluster. Various selection criteria may be employed, including the following.

Figure 4A:
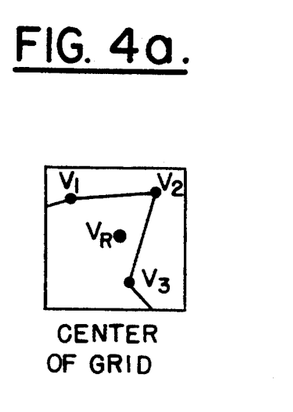
FIGS. 4a-4e each illustrate a different embodiment of a vertex clustering technique.

Center of grid (FIG. 4a)

For each cell that has at least two vertices, take the position of the center of the grid as the position of the representative vertex. This approach corresponds to mapping the vertices of the objects to a regular grid. In FIG. 4a the grid cell contains three vertices $V_1$, $V_2$, and $V_3$. The representative vertex ($V_R$) is positioned at the geometric center of the grid cell.

Figure 4B:
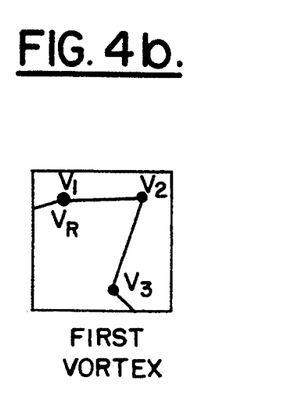

First vertex (FIG. 4b)

The position of a predetermined one of the vertices within a cell, for example the first ($V_1$), is made the representative vertex ($V_R$) of the cluster. This approach has the advantage of preserving some of the general geometry of the object, but also tends to exaggerate the variations between one simplification level and the next.

Figure 4C:
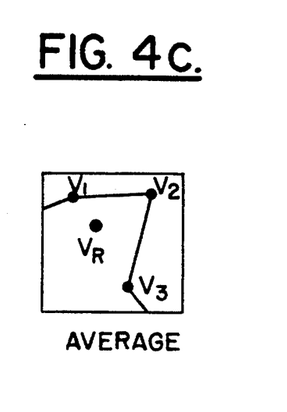

Average (FIG. 4c)

The average position of the vertices of a cluster is used to position the representative vertex ($V_R$). This approach tends to minimize the difference between two consecutive simplification levels, but also tends to shrink convex objects and holes. For example, a long tesselated cylinder shrinks to a line approximately coincident with a central, longitudinal axis of the cylinder. A visual side effect is that objects tend to shrink slightly from one simplification level to the next.

Figure 4D:
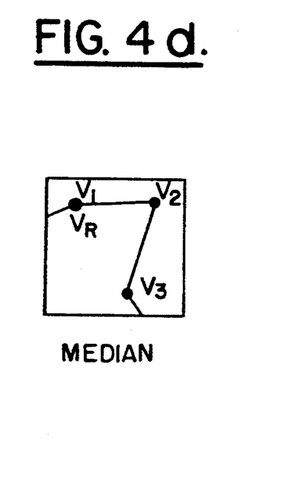

Median (FIG. 4d)

This approach selects, for each cluster, the vertex that lies closest to the average of all of the vertices. For the illustrated example, $V_1$ lies closest to the average vertex position, as was seen in FIG. 4c. As a result, the position of $V_1$ is taken to be the position of $V_R$. This approach is computationally more expensive than computing the average, because its implementation may require traversing the list of vertices twice. However, objects do not appear to shrink, and the effect of simplification on the visual appearance is minimized.

Figure 4E:
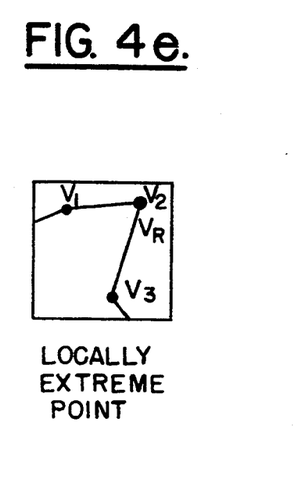

Locally extreme points (FIG. 4e)

To prevent objects from shrinking during simplification, it may be desirable to use the locally extreme point technique of FIG. 4e. These points have the highest probability of lying on the silhouette of the object. Therefore, using these points as representative vertices has the least visual impact on the appearance of an object between two consecutive simplification levels. One heuristic for selecting such points is to consider the vertices for which the largest angle, between tangent edges, is the smallest. Efficiently determining such a measure requires vertex-edge adjacency information stored in the Model, or the use of a data structure which provides this information without requiring a search through the entire set of vertices or triangles. For the illustrated embodiment, the vertex $V_2$ is taken to be the local extreme point and, as a result, $V_R$ is positioned at the coordinate location of $V_2$.

When preparing a plurality of objects for display, one or more of the foregoing selection criteria may be employed, depending upon the geometry of the particular object being prepared. For example, averaging may be employed for one object, while centering may be employed for another.

Simplification

Once the representative vertices of all the clusters have been determined, the triangles of the original Model may be found to be degenerate, or may be found to be duplicated. Triangles defined in terms of original vertices yield, in the simplified Model, triangles bounded by the representatives of the clusters of these vertices.

For example, if C(V1) is the representative of the cluster in which vertex V1 participates, then the triangle (V1,V2,V3) in the original Model produces the triangle (C(V1),C(V2),C(V3)). The new triangle is degenerated if its new vertices are not all distinct. When all three new vertices are equal to the same coordinates (within a same cell), the triangle degenerates into a single point. When two of the vertices are equal (within a same cell), the triangle degenerates into an edge. Duplicate triangles, edges, and points are preferably eliminated in order to improve performance. A preferred technique sorts the vertices of each triangle, and each edge, in lexicographic order. That is, an index is assigned to each cluster, and points (vertices) are sorted using the assigned index. Also, the point, edge, and triangle entries are stored within a data structure that is readily searched. An array or a linked list may be used for storing the sorted entries, although a sorted tree structure has been found to provide the best performance.

Figures 12A, 12B:
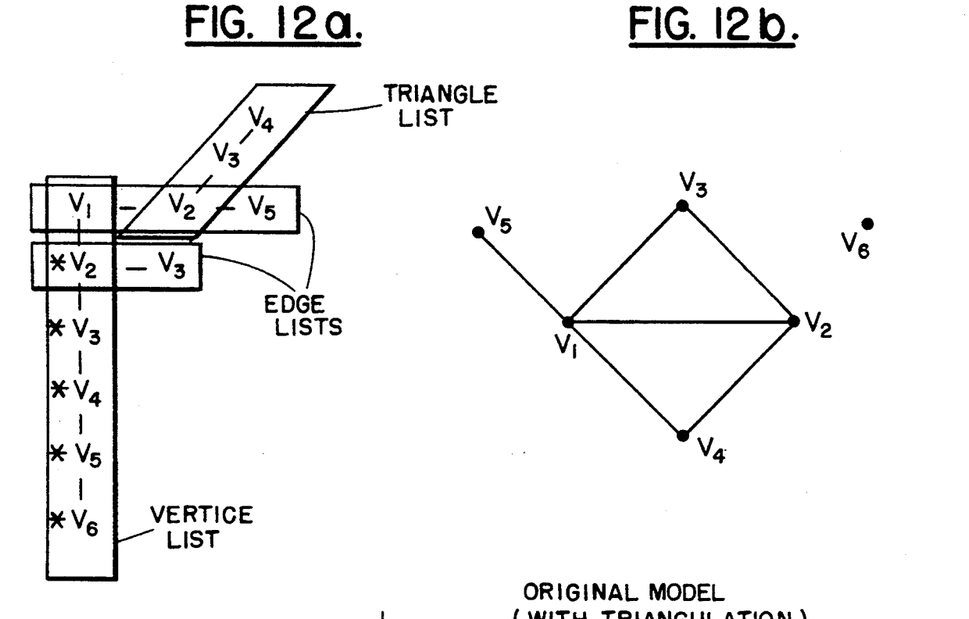

As an example of a linked list, reference is made to FIGS. 12a and 12b. FIG. 12a diagramatically illustrates a relationship between a vertex list, an edge list, and a triangle list, while FIG. 12b illustrates a portion of a Model that corresponds to the lists of FIG. 12a.

An exemplary linked list includes (a) one sorted list for all of the vertices, which are identified by their cluster index, (b) one sorted list for all edges that start at the same vertex, and (c) one sorted list for all triangles starting on entries of the edge lists.

As an example of the sorted list for all edges:
if edges $\{V_1, V_2\}$, $\{V_2, V_3\}$, $\{V_3, V_1\}$ are present, with index $(V_1)$<index $(V_2)$<index $(V_3)$, then there are two lists:

$V_1 \rightarrow V_2 \rightarrow V_3$(that accounts for edges $\{V_1, V_2\}$ and $\{V_3, V_1\}$), and $V_2 \rightarrow V_3$ (that accounts for edge $\{V_2, V_3\}$).

The lists shown in FIG. 12a correspond to two triangles $\{V_1, V_2, V_3\}$ and $\{V_1, V_2, V_4\}$, one isolated edge $\{V_1, V_5\}$ and one isolated vertex $\{V_6\}$, as shown in FIG. 12b. The entries marked with (*) in the lists are not used when collecting the resulting vertices, faces, and edges after simplification. That is, these entries are employed only to ease the simplification process. For example, there is no need to keep the edge $\{V_2-V_3\}$, since it is already part of triangle $\{V_1, V_2, V_3\}$.

Figure 5A:
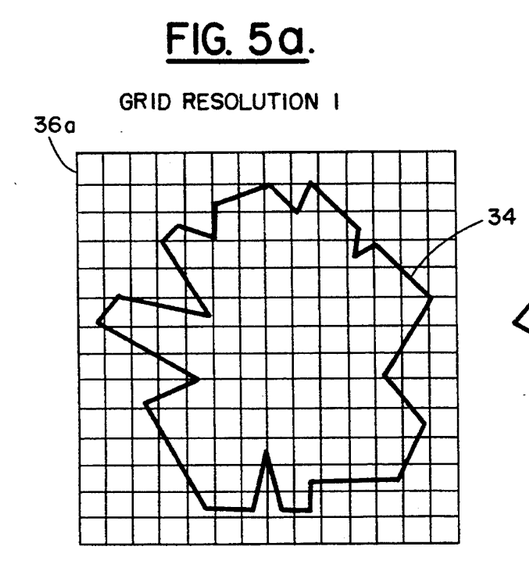
FIG. 5a illustrates an object Model having a grid with a first resolution superimposed thereon.
Figure 5B:
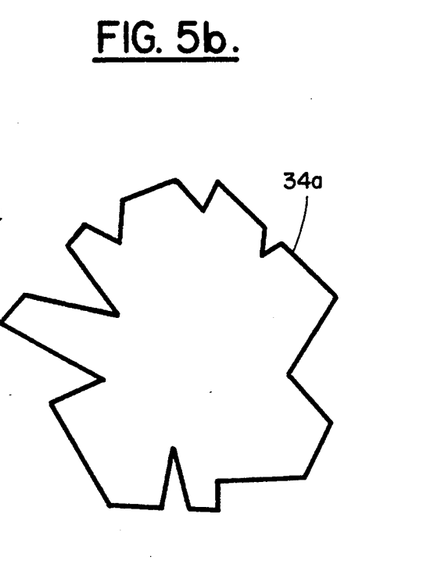
FIG. 5b illustrates the resulting object Model.

FIG. 5a illustrates an object Model 34 having a three dimensional grid 36a positioned thereon. The grid 36a has a first resolution that results in only one vertex appearing in any given grid cell. As a result, by whatever clustering method is employed, the resulting object Model 34a (FIG. 5b) duplicates the original Model 34.

Figure 6A:
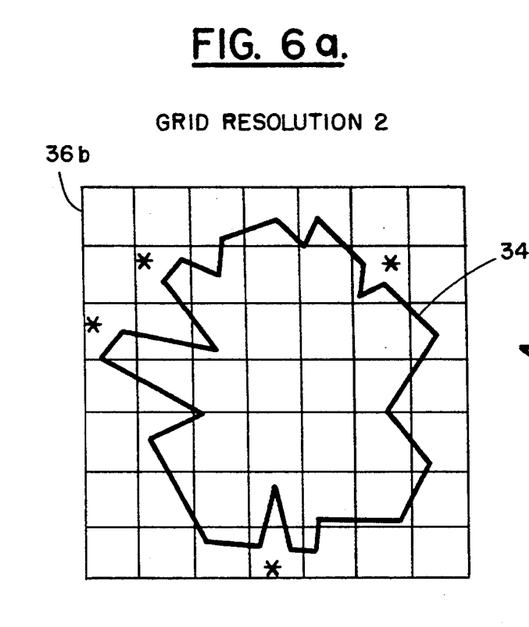
FIG. 6a illustrates the object Model of FIG. 5a having a grid with a second resolution superimposed thereon.
Figure 6B:
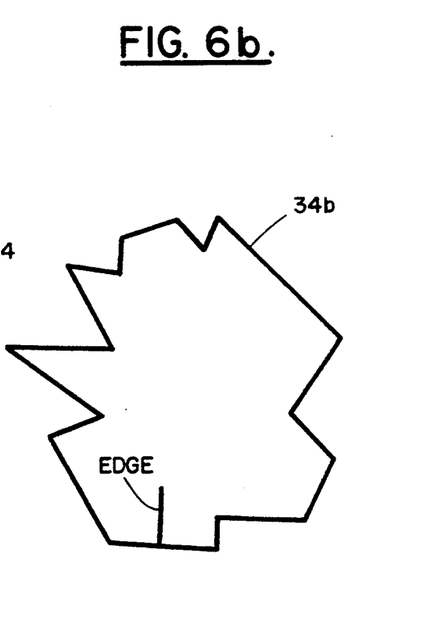
Figure 13A:
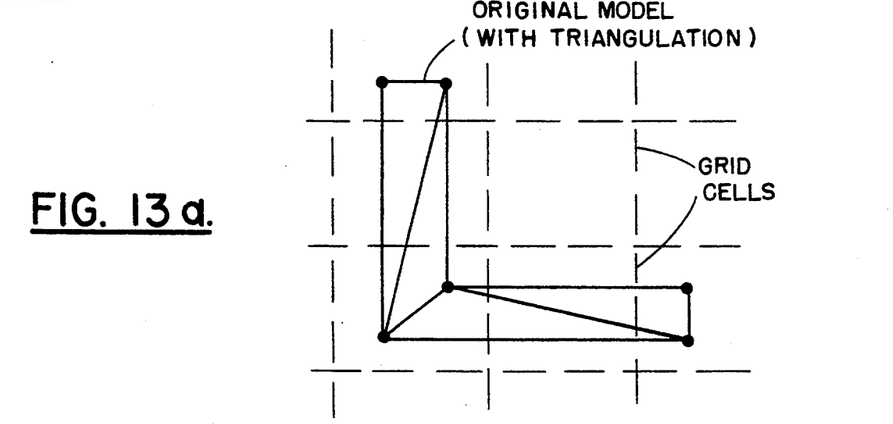
FIGS. 13a and 13b illustrate a triangulated model and a simplified verion thereof, respectively.
Figure 13B:
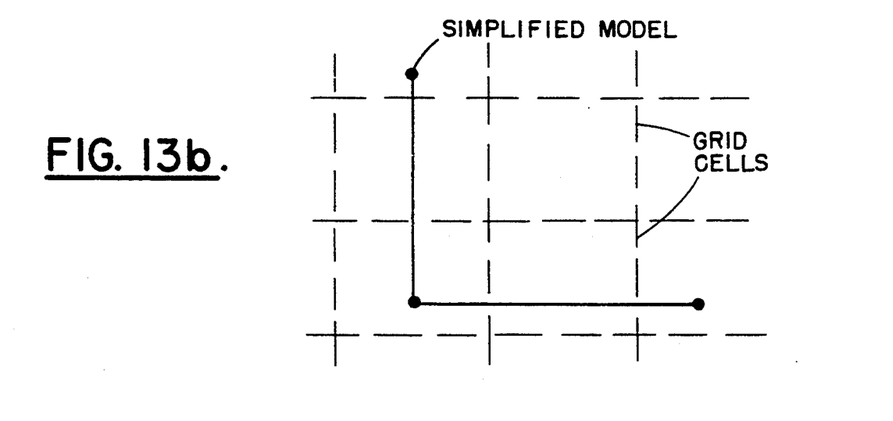

FIG. 6a illustrates the object Model 34 having a second three dimensional grid 36b positioned thereon, the grid 36b having a resolution that is one half that of the grid 36a. As a result, in the grid cells designated with asterisks (*) more than one vertex is found. For these grid cells the application of one of the clustering methods described above, such as averaging, results in the simplified Model 34b of FIG. 6b. It should be noted that a portion of the simplified Model 34b is reduced to an edge, as seen in the lower portion of the simplified Model 34b. When such an edge survives the simplification process, it is kept and displayed as a line segment. An example of the importance of maintaining edges is illustrated in FIGS. 13a and 13b, wherein FIG. 13a illustrates an original Model, with triangulation, and FIG. 13b illustrates the simplified Model which is composed of two edges. In that the adjacent vertices of the original Model all lie within common grid cells, if the resulting edges were not preserved the simplification technique would result in the elimination of the simplified Model.

Figure 7A:
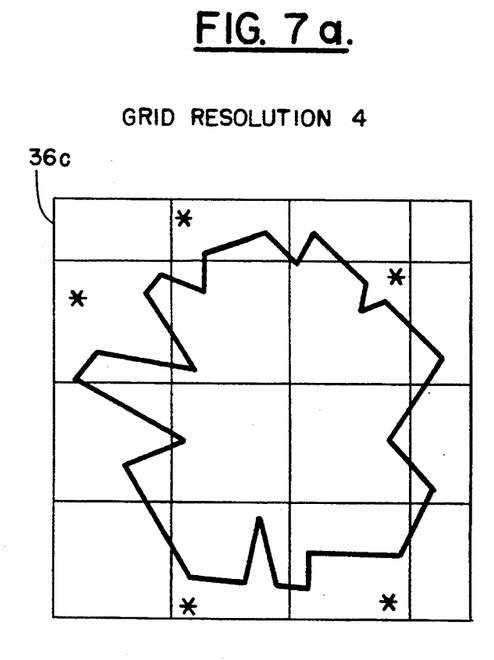
FIG. 7a illustrates the object Model of FIG. 5a having a grid with a third resolution superimposed thereon.
Figure 7B:
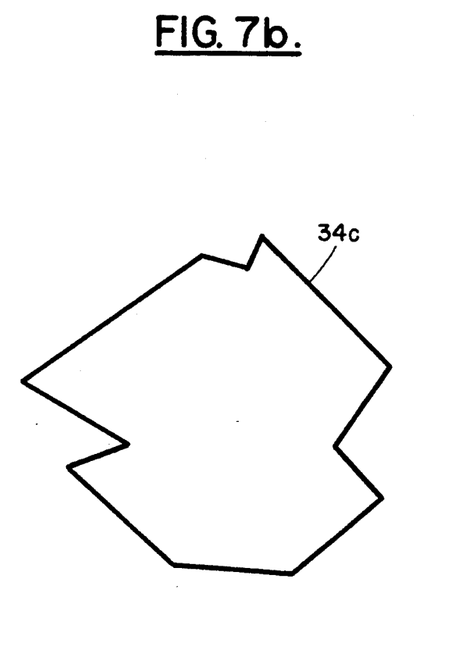

FIG. 7a illustrates the object Model 34 having a third three dimensional grid 36c positioned thereon, the grid 36c having a resolution that is one half that of the grid 36b. As a result, in the grid cells designated with asterisks (*) more than one vertex is found. For these grid cells the application of one of the clustering methods described above, such as averaging, results in the simplified Model 34c of FIG. 7b.

The description given immediately above operates in accordance with the first simplification technique described above, wherein the original object Model is employed with simplification factors of increasing magnitude. If the second technique were to be employed instead, the simplified Model 34b would be employed with the grid 36c of FIG. 7a.

Having determined a plurality of simplified models (34b and 34c) for the object Model 34, the object Model 34 and the simplified versions thereof are stored within a database of graphic models. FIG. 1b illustrates a memory 12a that is coupled to the CPU 12 of FIG. 1a. The memory 12a stores a plurality of object models (MODEL $_1$—MODEL$_j$) and, in accordance with the invention, also stores one or more simplified models (S1, S2, etc.) for each of the object models. A further discussion of FIG. 1b will be made below.

Simplification factors

As has been described, for each object the method predetermines a number of simplified models at different resolutions. These simplified models are stored together with the original object. During visualization, the method operates to dynamically select a simplification level that defines which Model (simplified or not) to use for each object, depending on the viewing conditions and the size of the object's projection on the viewing screen.

Figure 10:
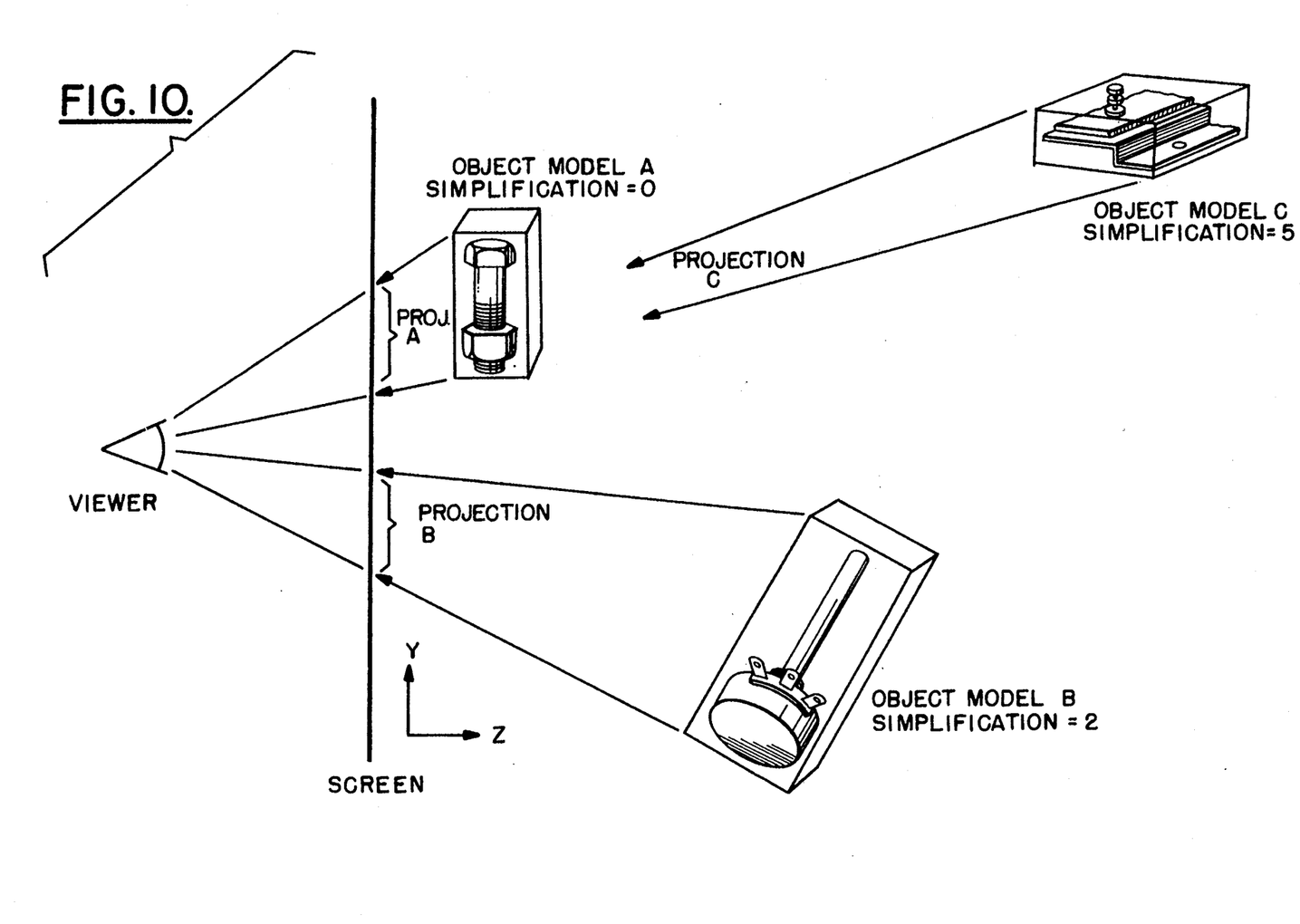
FIG. 10 illustrates the display of two objects and their resultant projections upon a display screen.

FIG. 10 illustrates an object Model A, an object Model B, and an object Model C, each of which is disposed at a different distance along the z-axis Each Model has a projection upon a viewing screen. Bounding boxes for each of the object Models are also shown. For the illustrated embodiment, the object Models A and B have a projection that is approximately equal to one another, although the object Model B is significantly larger than the object Model A. Object Models A and B each have a larger projection upon the viewing screen than does the larger object C, due to their proximity to the viewing screen. As a result, the object A is displayed with a Model having a simplification factor of zero, that is the original Model is displayed, object B is displayed with an object Model having a simplification factor of two, and object C is displayed with an object Model having a simplification factor of five (lowest resolution). If the viewer were to manipulate the display so as to bring object Model B forward along the z-axis, the apparent size and the projection of the bounding box of object B upon the viewing screen would grow larger, and the object B would be displayed with an object Model of higher resolution, such as an object Model having a simplification factor of zero or one.

By example, it is assumed that a simplification level 0 produces the original unsimplified object (such as in FIGS. 5a, 5b), and that other simplification levels (1 through 5) correspond to Models of decreasing complexity. It is desirable to choose resolution factors such that the complexity of the models is consistent across all the objects for the same simplification level, so that during rendering it is sufficient to select the appropriate simplification level for each object, regardless of its original complexity. A presently preferred criteria employs a number of object points as a measure of the complexity. One technique for achieving consistency is to maintain a constant ratio between the number of points in a Model, that is, the number of vertices of the polyhedra, and the relative size of the Model with respect to the entire scene. Thus, it is important to estimate the effect of a reduction of the resolution on the Model complexity. This will be discussed below. Furthermore, efficient techniques are described for selecting the optimal simplification level for each object.

Selection of resolution factors

Reducing the resolution of a Model is equivalent to defining larger grid cells, and to therefore clustering those vertices that fall within the larger cell into a single new vertex.

So as to simplify this analysis, it is assumed that the object Model has been previously simplified to level 1 by using a resolution R that defines N cells, and that the Model involved V supporting points (vertices of the polyhedra). A description is now provided of a technique to estimate the number of points resulting from a simplification at level 2 with resolution 2R. For simplicity, the same resolution factor in all three dimensions is employed, although in practice a different resolution factor may be used for each dimension.

In a simplified Model each cell is either empty, or is occupied by a single point, in which case the cell is said to be full. The probability (p) of a cell in Model i being full is V/N. A cell of Model 2 combines eight cells of Model 1. Let $P_0$ denote the probability of a cell of Model 2 being empty. Let $P_1$ denote the probability of a cell of Model 2 containing exactly one full cell of Model 1, and so on until $P_8$, the probability of a cell of Model 2 of containing eight full cells of Model 1. These probabilities are defined as follows:

$$P_i = \binom{8}{i} p^i (1-p)^{8-i}.$$

It is noted that for a non-simplified Model, p may be arbitrary. However, for simplified models p is between 0 and 1, and approaches 1 as the resolution decreases. When a cell of Model 2 contains less than two full cells of Model 1 no points are eliminated by the simplification for that cell. When a cell of Model 2 contains exactly two full cells of Model 1 one point is eliminated by the simplification and the probability of occurrence is $P_2$. When a cell of Model 2 contains exactly three full cells of Model 1, two points are eliminated by the simplification and the probability of this occurrence is $P_3$. Continuing this reasoning yields the following estimate of the number E of points eliminated by the simplification for one cell:

$$E = 1P_2 + 2P_3 \ldots 7P_8.$$

The number V' of remaining points in Model 2 is thus estimated by:

$$V' = V - E(N/8).$$

The above analysis is based on a random distribution of the vertices of an object within its enclosing box. In practice, this distribution is highly irregular and, thus, simplification in general eliminates more points than is indicated by the above analysis.

Referring again to FIG. 1b, the system 10 includes user input devices such as a keyboard 16a and/or a pointing device, such as a trackball or a mouse 16b. During use, an entire scene may be moved according to a user's command. By example, the user activates a key of keyboard 16a or moves the mouse 16b. In response, the CPU 12 may access a simplified Model to be used for each object within the scene. The system 10 automatically switches to the simplified Model when the user initiates the motion of the objects in the scene. When the motion stops, the system 10 returns to the full resolution mode. This may be triggered by an explicit user action (press a key), or if there is no user intervention for a predefined interval of time (timeout). A simplification level to be used in this mode can be selected by the user, and is a function of the size of the Model and the expected performance of the graphic system 10. The goal is to select from the memory 12a the most detailed Model, while also permitting realtime motion to be achieved. That is, the original Model is selected if the time required to display the original Model, including the calculation of shading, reflections, perspective transformation, etc., is not inconsistent with providing realtime motion of the object on the display 16, otherwise one of the simplified Models is selected. If the detail present in the first simplified Model requires a display time that is inconsistent with providing realtime motion of the object on the display 16, then the second simplified Model is considered, and so forth.

As an alternative to the above approach, where the same simplification level is used for all of the displayed models, an adaptive approach may be employed. For this approach the system 10 selects an appropriate simplification level independently for each object. This selection may be performed, using the enclosing box around each object, by determining the size of the projection of the bounding box on the screen plane (as in FIG. 10), and by comparing the size of the projection to predetermined limit values. To this end, a further storage device 12b is provided wherein there are stored screen projection limit values for each Model (LIMITS $M_1$—LIMITS $M_i$). CPU 12 accesses these limits and compares same to the determined screen projection size for a particular Model. Based on this comparison, an appropriate Model is selected from the memory 12a. Objects that project onto small figures on the screen plane are rendered using a strongly simplified Model. The limit values may be different for each Model, or may be tabulated depending on the Model complexity. For example, if a Model has a small number of faces, there is no significant advantage in using a simplified Model, even when the Model's projection on the screen is small. During this projection process, Models that do not project on the screen, or that project onto some predetermined lower threshold limit of display pixels, are detected and not displayed. The enclosing three-dimensional boxes are computed in the local coordinate systems of the Model, and may be propagated in the Model's hierarchy to permit the elimination of entire sub-assemblies.

For example, it is a common practice to represent identical parts as assemblies, with each level of the assembly hierarchy representing a collection of sub-assemblies. At the lowest level, a sub-assembly may be Just a solid. As described above, the simplification process is applied to solids (including bounding boxes computations). However, these calculations may also be performed at the level of assemblies: that is, the bounding box of an assembly is determined using the bounding boxes of its sub-assemblies, in a recursive manner down to the solid. The decision of whether or not to display, or the choice of simplification factor, may then be made using the bounding box of the assembly.

The simplification technique of the invention may also be used as a filter for measured data, for example in medical applications. However, care must be taken to preserve important features, despite their small size.

That is, for the display of industrial parts, it is commonly accepted practice that details should be removed, so long as they can be retrieved upon demand. However, for medical imagery it may be the case that a small detail (small enough to be removed by the simplification) is a feature of greatest interest. Thus, when applying the teaching of the invention to the display of some types of data, it should be realized that size may be but one criteria considered during simplification.

Figure 11:
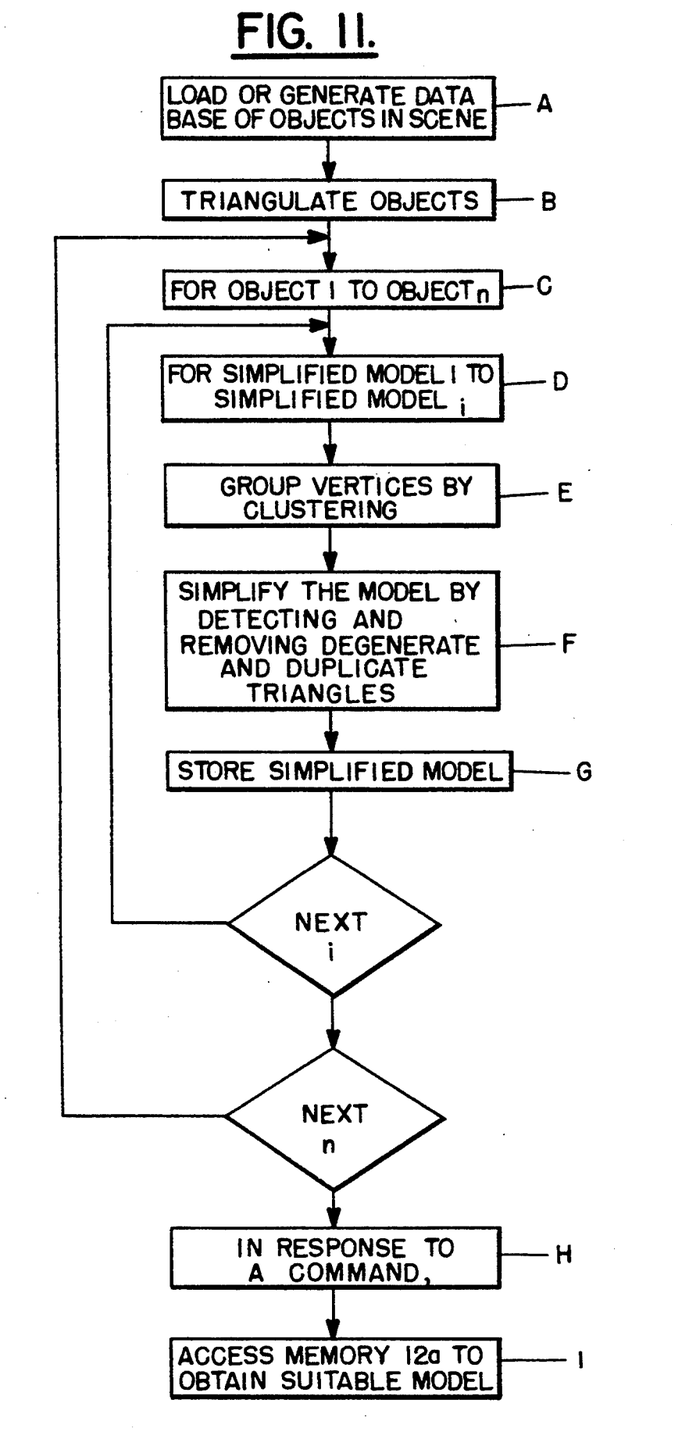
FIG. 11 is a flowchart that depicts the operation of the method of the invention.

FIG. 11 is a flowchart that depicts the operation of the method of the invention. At Block A the system 10 loads or generates a database of objects appearing in a scene to be displayed. By example, the objects may be elements of a CAD database of mechanical parts and assemblies of parts. These objects are triangulated using one of a number of known types of triangulation methods. As a result, the surface of each object is tesselated as in FIG. 2. Then, for each object, and for each simplified Model of the object, the system performs the following steps. At Block C, the vertices are grouped by clustering in accordance with the resolution of a selected sampling grid. At Block D, the Model is simplified by detecting and removing degenerate and duplicate triangles. At Block E the simplified Model is stored in the memory 12a in association with its base Model. At the completion of Block E for all of the simplified models, and for all of the objects, the system 10 is ready to begin an interactive display session with a user.

In response to a command from the user (Block F) to change the position of a displayed object, or to rotate or otherwise manipulate the displayed object, the system 10 accesses the memory 12a (Block G) to obtain a suitable Model. By example, if the user commands the system to rotate an object at a high speed, the simplified Model having the highest simplification factor is accessed from the memory 12a. This simplified Model is passed to the geometric processor 18, and from the geometric processor 18 to the other components of the graphics subsystem 14, resulting in the display of the simplified Model during the rotation. When rotation terminates, the Model that was previously displayed is once more accessed and displayed to the user. Similarly, if the user commands the system to zoom in on an object in the background, the object being displayed with a Model having a high simplification factor, the system 10 accesses a Model having a lower simplification factor, such as the original Model or the first simplification thereof, and displays the more detailed Model to the user. As was previously described, it is within the scope of the invention for the system 10 to select an appropriate simplified Model for display as a function of the size of the Model's bounding box projection upon the display screen, as a function of the complexity (number of faces) of the Model, etc.

Figure 14:
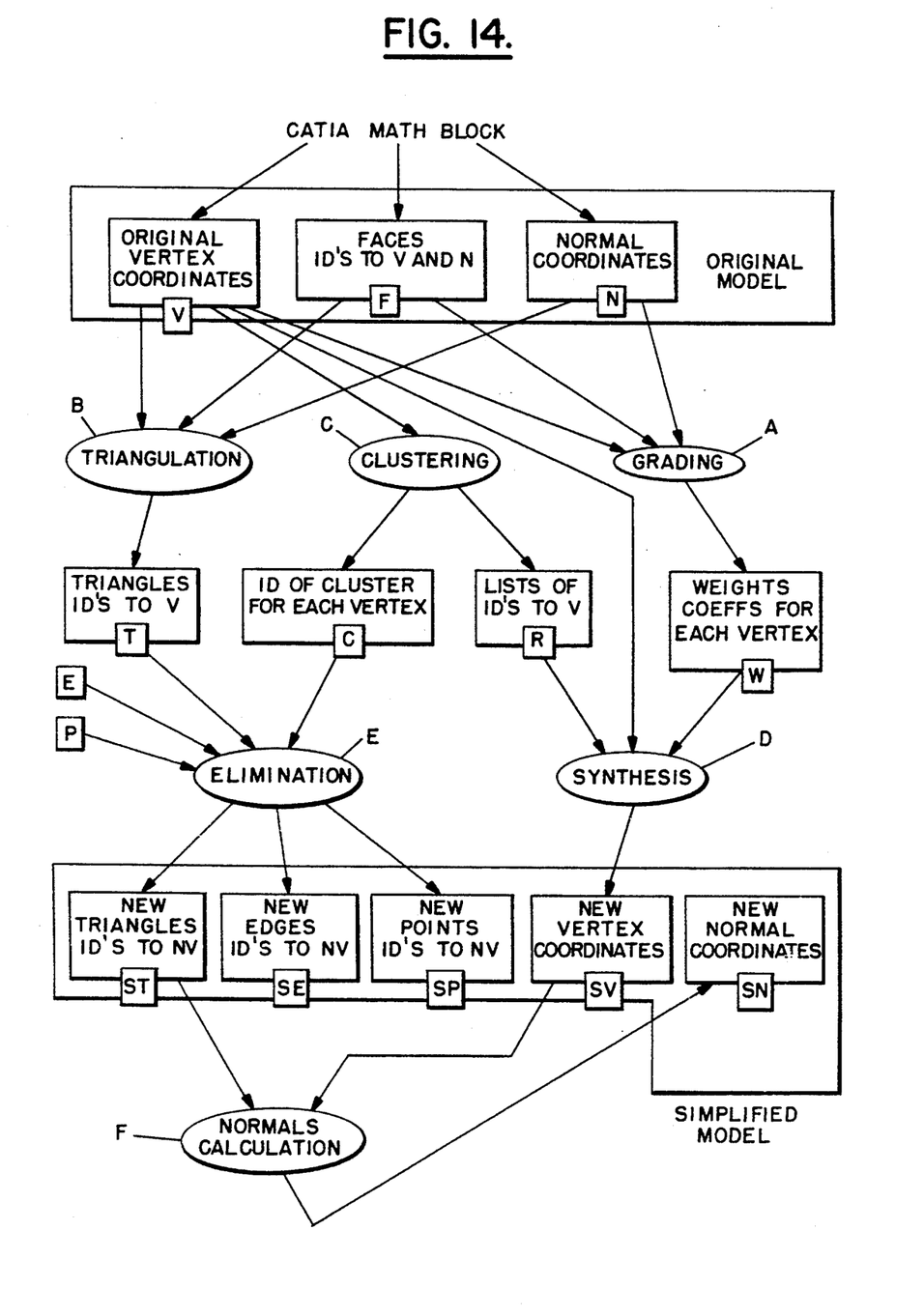
FIG. 14 is a flow diagram that illustrates the method of the invention.

FIG. 14 is a flow diagram that illustrates in greater detail the method of the invention. An original object is defined by, by example, a CATIA math block. A number of data tables are maintained and employed by the method of the invention. These data tables are illustrated in FIG. 14 as being associated With various blocks, and are defined below.

V: x,y,z coordinates of the original vertices
x,y,z coordinates of original unit normal vectors
P: one id to V for object's isolated points
E: two ids to V for object's isolated edges
F: id to N for face normal, number of loops, lists of loops for the object's planar faces (for each loop: number of vertices, a list of ids to V defining the loop vertices in, by example, clockwise order)
T: three ids to V for object's triangular faces
W: weight between 0 and 1 attached to each V
C: list of ids for V for each cluster
R: one id to C attached to each V
SV: x,y,z coordinates of the vertices of the simplified object
SN: x,y,z coordinates of the unit normal vectors of the simplified object
SP: one id to SV for each isolated point of the simplified object
SE: two ids to SV for the isolated edges of the simplified object
ST: three ids to SV for the triangular faces of the simplified object Having defined the various data tables, the individual blocks shown in FIG. 14 are now defined.

GRADING (Block A)

This block determines a weight for each vertex according to its graphic importance. Vertices with higher weights have less chance of being moved during simplification. This block creates a W table with one weight per original vertex. In a simplest embodiment, all weights may be set equal to one another.

TRIANGULATION (Block B)

This block decomposes each face into triangles that use the original vertices, and creates a T table of triangles.

Several processes can be applied to simplified data to further simply the data. These processes include the following.

CLUSTERING (Block C)

This block groups vertices into clusters using geometric proximity, and establishes bi-directional pointers from the original vertices to clusters (R table) and from clusters to original vertices (C table). This block takes as parameters, a box, a matrix, and three resolution factors.

SYNTHESIS (Block D)

This block determines a best representative vertex ($V_R$) for each cluster using geometric information and weights. This block produces the SV table and the W table of the corresponding weights, and employs direct access into the V table when following the C table pointers, ELIMINATION (Block E)

This block detects all degenerate triangles and edges and eliminates duplicate points, edges, and triangles. It also eliminates points used by edges, or triangles and edges used by triangles. The search for duplicates uses an internal, temporary data structure.

NORMALS CALCULATION (ADJUSTING) (Block F)

This block determines new normals to the triangles for shading. It should be noted that triangles do not have id references to the SN table. However, two tables are used as parallel structures: the i-th entry in the ST table corresponds to the i-th entry in the SN table. This block takes as parameters: a policy flag for flat or smooth normals, and a limit angle.

Entries in Table 1 represent read (r) and write (w) accesses to the data tables by the simplification modules.

TABLE 1

| MODULES | INPUT TABLES | | | TEMPORARY | | | | OUTPUT TABLES | | | | | |
|---|---|---|---|---|---|---|---|---|---|---|---|---|---|
| | V | F | N | T | W | C | R | SV | SW | ST | SE | SP | SN |
| TRIANGULATION | r | r | r | w | | | | | | | | | |
| GRADING | r | r | r | | w | | | | | | | | |
| CLUSTERING | r | | | r | w | w | | | | | | | |
| SYNTHESIS | r | | | | r | r | | w | w | | | | |
| ELIMINATION | | | | r | | | r | | w | w | w | | |
| ADJUSTING | | | | | | r | | | r | | | | w |

The output data tables (SV, SW, ST, SE, SP) resulting from previous simplification steps may be used as input tables (V, W, T, E, P) for a further simplification step. This is illustrated in Table 2.

TABLE 2

| MODULES | INPUT TABLES | | | | | TEMP | | OUTPUT TABLES | | | | | |
|---|---|---|---|---|---|---|---|---|---|---|---|---|---|
| | V | W | T | E | P | C | R | SV | SW | ST | SE | SP | SN |
| CLUSTERING | r | r | | | | w | w | | | | | | |
| SYNTHESIS | r | r | | | | r | | w | w | | | | |
| ELIMINATION | | | r | r | r | | r | r | | w | w | w | |
| ADJUSTING | | | | | | | r | | r | | | | w |

Entries in V, W, and R are synchronized (i.e. they have the same number of entries, which correspond to one another for a given index). Entries in T and W are also synchronized. T contains the result of triangulating faces of F. For simplicity, the original data is assumed to be the boundary of a solid and only has faces, thus P and E are not used for the original simplification. On the other hand, if simplifying previously simplified objects, the original data may be triangulated, in which case there is no F table and the process begins instead with the T table. However, it is also possible to begin from non-triangulated models that also have dangling edges and points.

Several simplification techniques may be used. A first is local simplification, wherein each object is simplified using a minimax box in local coordinates and resolution factors. Integers are employed to ensure that the cell size is approximately uniform. A second simplification technique is global simplification, wherein each object is simplified using a common minimax box with unique resolution factors positioned by the user interactively. Vertices that lie outside of the minimax box are not clustered nor moved.

One technique to select which model to use for graphics is given below.

(A) Compute a minimax box for each solid in the global coordinate system. For moving solids, compute the minimax box around the entire motion. Store with the object: (a) a center, and (b) a radius of the enclosing sphere.

(B) Construct a three-dimensional minimax box around the entire object and divide the three-dimensional minimax box uniformly into K×L×M approximately square cells. For each object, and for each internal node, store a string of K×L×M bits.

(C) During display, and given a new location of the camera, determine which cells project onto the screen. Construct a string of bits with 1's for the cells that project onto the screen, and 0's for cells that do not project onto the screen. Then, for each node, perform an AND function between the two strings to see if there is a match. Then, compute the radius of a circle that would contain the projection of the object onto the screen from the stored center and radius, and determine therefrom which simplification level to employ.

Figure 8:
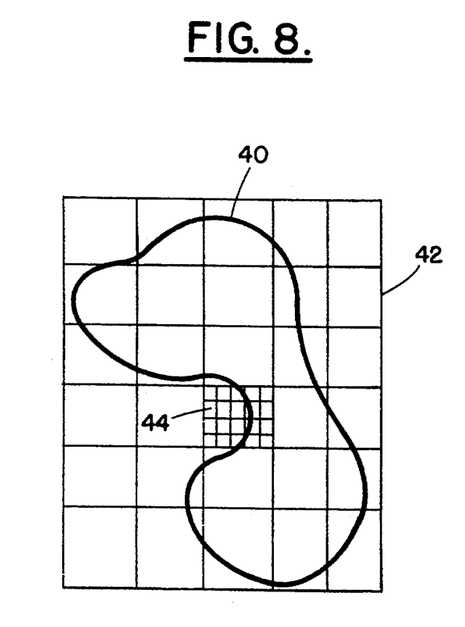
FIG. 8 shows the use of a grid having cells of a first resolution and one cell of finer resolution.

Although described in the context of presently preferred embodiments of the invention, it should be realized that the teaching of the invention should not be construed to be limited to only these preferred embodiments. For example, FIG. 8 shows an object Model 40 that has a regular orthogonal grid 42 disposed thereon. The grid 42 has a first resolution. However, it may be desirable to display one portion of the object Model 40 at a higher level of detail than the rest of the object Model. This is accommodated by providing a second grid 44 upon a region or regions of the object Model 40 wherein it is desired to provide greater display detail. As seen, the second grid 44 has a significantly finer resolution than the grid 42, This results in, during clustering, the preservation of object detail within the portion of the object Model 40 that lies within the second grid 44.

It is also within the scope of the invention to display objects at a periphery of the scene with a Model of greater simplification, in that objects that are located at peripheral regions of the human retina are perceived at lower resolution that are objects in the center of the retina.

Figure 9:
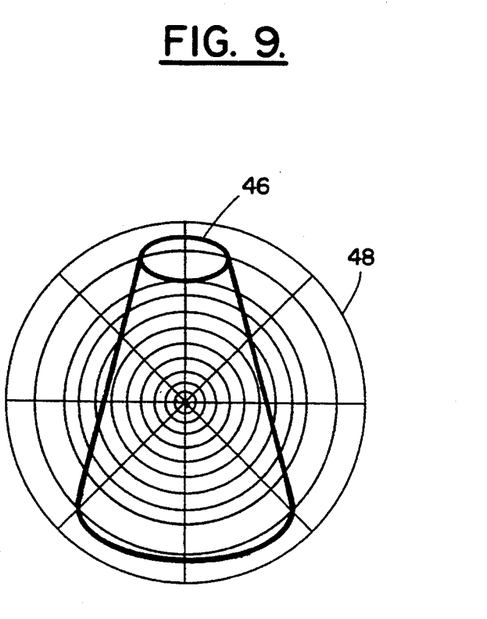
FIG. 9 illustrates the use of a non-orthogonal grid embodiment.

Also, although the object has been described in the context of two dimensional and three dimensional grid cells having substantially uniform linear dimensions, it should be realized that the grid cells may have a variety of shapes. FIG. 9 illustrates one embodiment wherein an object Model 46 has a three dimensional circular grid 48 superimposed thereon. The grid 48 is characterized by a set of segmented concentric circles, the grid cells providing increasing resolution towards the center of the grid. The clustering techniques described in FIGS. 4a–4e are also applicable to the grid cell geometry shown in FIG. 9.

Thus, while the invention has been particularly shown and described with respect to preferred embodiments thereof, it will be understood by those skilled in the art that changes in form and details may be made therein without departing from the scope and spirit of the invention.

Having thus described our invention, what we claim as new, and desire to secure by Letters Patent is:

1. A method for execution by a data processor to prepare an object for display on a display means wherein the object is represented by a plurality of vertices and planar faces each having boundaries defined in terms of the plurality of vertices, the method comprising the steps of:

generating a first model of the object that represents the object's original geometry by partitioning the planar faces of the object into a plurality of non-overlapping planar sub-faces each having boundaries defined in terms of the plurality of vertices of the object;

partitioning space enclosing the first model into a first plurality of grid cells;

generating a first simplified model by, for each grid cell of the first plurality of grid cells containing more than one vertex of the first model, combining the vertices of the first model within the grid cell into at least one first representative vertex; and storing the first simplified model for subsequent use.

2. A method as set forth in claim 1 wherein the combining of the step of generating a first simplified model includes a step of selecting a center of the grid cell as a position of the first representative vertex.

3. A method as set forth in claim 1 wherein the combining of the step of generating a first simplified model includes a step of selecting a position of a predetermined one of the vertices within the grid cell as a position of the first representative vertex.

4. A method as set forth in claim 1 wherein the combining of the step of generating a first simplified model includes a step of determining an average position of the vertices within the grid cell, and a step of selecting the average position as a position of the first representative vertex.

5. A method as set forth in claim 1 wherein the combining of the step of generating a first simplified model includes a step of determining an average position of the vertices within the grid cell, and a step of selecting as the first representative vertex a vertex within the grid cell that is nearest to the average position.

6. A method as set forth in claim 1 wherein the combining of the step of generating a first simplified model includes a step of selecting as the first representative vertex a vertex within the grid cell that represents a locally extreme point, wherein the selected vertex has a greatest probability of lying on a silhouette of the object.

7. A method as set forth in claim 1 wherein the partitioning of the step of generating a first model includes a step of triangulating the faces of the object, and wherein the step of generating a first simplified model includes a step of detecting and eliminating degenerate and duplicate triangles that result from the execution of the combining of the step of generating a first simplified model.

8. A method as set forth in claim 1 and further including a step of selecting one of the first model and the first simplified model for display on the display means.

9. A method as set forth in claim 8 wherein the step of selecting includes a step of determining a size of a projection of the object onto the display means, and wherein the step of selecting selects one of the first model and the first simplified model as a function of at least the determined size of the projection.

10. A method as set forth in claim 8 wherein, in response to a required motion of the object on the display means, the step of selecting selects the first model if a time required to display the first model is sufficiently small for providing realtime motion of the object on the display means, otherwise the step of selecting selects the first simplified model.

11. A method as set forth in claim 8 wherein the step of selecting includes a step of determining a number of faces of the object, and wherein the step of selecting selects the first model if the number of faces is below a threshold number of faces.

12. A method as set forth in claim 1 further including the steps of:

partitioning space enclosing the first model into a second plurality of grid cells, wherein said second plurality of grid cells has a larger dimension than a corresponding dimension of said first plurality of grid cells;

generating a second simplified model by, for each grid cell of the second plurality of grid cells containing more than one vertex of the first model, combining the vertices of the first model within the grid cell into at least one second representative vertex; and storing the second simplified model for subsequent use.

13. A method as set forth in claim 1 further including the steps of:

partitioning space enclosing the first simplified model into a second plurality of grid cells, wherein said second plurality of grid cells has a larger dimension than a corresponding dimension of said first plurality of grid cells;

generating a second simplified model by, for each grid cell of the second plurality of grid cells containing more than one vertex of the first simplified model, combining the vertices of the first simplified model within the grid cell into at least one second representative vertex; and storing the second simplified model for subsequent use.

14. A method for execution by a data processor to prepare an object for display on a display means wherein the object is represented by a plurality of vertices and planar faces each having boundaries defined in terms of the plurality of vertices, the method comprising the steps of:

generating a first model of the object that represents the object's original geometry by partitioning the planar faces of the object into a plurality of nonoverlapping triangular regions each having boundaries defined in terms of the plurality of vertices of the object;

partitioning space enclosing the first model into a plurality of grid cells;

generating a first simplified model by, for each grid cell of the plurality of grid cells containing more than one vertex of the first model, combining the vertices of the first model within the grid cell into at least one representative vertex in accordance with a combination criteria;

storing the first model for subsequent use; and storing the first simplified model for subsequent use.

15. A method as set forth in claim 14 wherein the combination criteria selects a center of the grid cell as a position of the representative vertex.

16. A method as set forth in claim 14 wherein the combination criteria selects a position of a predetermined one of the vertices within the grid cell as a position of the representative vertex.

17. A method as set forth in claim 14 wherein the combining of the step of generating a first simplified model includes a step of determining an average position of the vertices within the grid cell, and wherein the combination criteria selects the average position as a position of the representative vertex.

18. A method as set forth in claim 14 wherein the combining of the step of generating a first simplified model includes a step of determining an average position of the vertices within the grid cell, and wherein the combination criteria selects a vertex within the grid cell that is nearest to the average position as the representative vertex.

19. A method as set forth in claim 14 wherein the combination criteria selects a position of a vertex that represents a locally extreme point within the grid cell as a position of the representative vertex, wherein the selected position is a position that has a greatest probability of lying on a silhouette of the object.

20. A method as set forth in claim 14 wherein each of the plurality of grid cells is of substantially equal size.

21. A method as set forth in claim 14 wherein the plurality of the three dimensional grid cells are of different sizes.

22. Graphics display apparatus for displaying at least one object, comprising:

memory means for storing a model of an object and for storing at least one simplified model of the object, the model having a first plurality of vertices and the at least one simplified model having a second plurality of vertices that is less than the first plurality of vertices;

means, responsive to a command from a user of the apparatus, for indicating that a motion of displayed object is to occur; and processing means, coupled to and responsive to the indicating means, for accessing the memory means to select for display one of the model of the object and one of the at least one simplified models of the object.

23. Graphics display apparatus as set forth in claim 22 wherein said processing means includes means for processing the model of the object so as to produce said at least one simplified model thereof, said processing means including, means for partitioning space enclosing the model into the plurality of cells;

means, responsive to one of the plurality of cells containing more than one vertex of the model, for combining the vertices within the cell into a representative vertex; and means for generating said at least one simplified model so as to include the representative vertex.

24. Graphics display apparatus as set forth in claim 23 and further including means for storing a tree data structure containing vertices of the model.

25. Graphics display apparatus as set forth in claim 23 and further including means for storing a linked list data structure containing vertices of the model.

26. Graphics display apparatus as set forth in claim 22 and further including means for storing limit values related to a size of a projection of the object on a display screen means, and wherein said processing means is responsive to a determined size of a projection of the object, and to said stored limit values, to select one of said models for display.

27. Apparatus for displaying an object represented by a plurality of vertices and planar faces each having boundaries defined in terms of the plurality of vertices, the apparatus comprising:

means for generating a first model of the object that represents the object's original geometry by partitioning the planar faces of the object into a plurality of non-overlapping planar sub-faces each having boundaries defined in terms of the plurality of vertices of the object;

means for partitioning space enclosing the first model into a plurality of grid cells;

means for generating a simplified model of the object, responsive to a condition wherein one of the plurality of grid cells contains more than one vertex of the first model, by combining the vertices contained within the one grid cell into a resultant vertex having a position that is a function of the positions of the vertices contained within the one grid cell; and means for storing the simplified model for subsequent use in displaying the object.

28. A method for execution by a data processor to prepare a representation of an object for display on a display means, wherein the object is represented by a plurality of vertices and planar faces each having boundaries defined in terms of the plurality of vertices, the method comprising the steps of:

generating a first model of the object that represents the object's original geometry by partitioning the planar faces of the object into a plurality of non-overlapping planar sub-faces each having boundaries defined in terms of the plurality of vertices of the object;

partitioning space enclosing the first model into a plurality of grid cells;

generating a simplified model of the object by combining, in response to a condition wherein one of the plurality of grid cells contains more than one vertex of the first model, the vertices contained within the one grid cell into a resultant vertex having a position that is a function of the positions of the vertices contained within the one grid cell; and storing the simplified model for subsequent use in displaying the object.

* * * * *